United States Patent
Scholl et al.

[11] 3,895,020
[45] July 15, 1975

[54] PREPARATION OF 4,5-BIS-(TRIFLUOROMETHYLIMINO)-THIAZOLIDINES

[75] Inventors: Hans-Joachim Scholl, Cologne; Erich Klauke, Odenthal; Ferdinand Grewe, Burscheid; Ingeborg Hammann, Cologne, all of Germany

[73] Assignee: Bayer Aktiengesellschaft, Leverkusen, Germany

[22] Filed: Dec. 8, 1971

[21] Appl. No.: 206,158

[30] Foreign Application Priority Data
Dec. 18, 1970 Germany............................ 2062348

[52] U.S. Cl.... 260/306.7 T; 260/256.5 R; 424/251; 424/270
[51] Int. Cl............................................. C07d 99/10
[58] Field of Search .............. 260/306.7 T, 256.5 R

[56] References Cited
OTHER PUBLICATIONS
Ogden et al., J. Am. Chem. Soc., 89, 5007–5011 (1967).

*Primary Examiner*—Richard J. Gallagher
*Attorney, Agent, or Firm*—Burgess, Dinklage & Sprung

[57] ABSTRACT

4,5-Bis-(trifluoromethylimino)-thiazolidines are prepared by reacting the thiol form of a thiourea or a thiocarboxylic acid amide having at least one hydrogen atom on each urea of amide nitrogen atom with perfluoro-2,5-diazahexa-2,4-diene in the presence of a hydrogen fluoride acceptor at a temperature of about −50° to 120°C, in accordance with the following formula

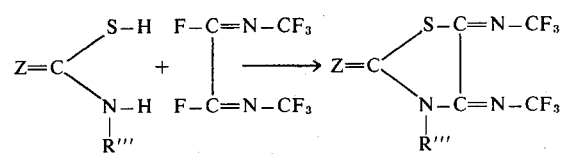

in which
Z is = N—R or

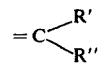

and
R, R', R" and R'" each is hydrogen or various optionally substituted hydrocarbon or heterocyclic radicals, several of them together possibly forming a heterocyclic ring.

The invention also extends to compositions containing, and methods of using, the new compounds to combat fungi, insects and acarids.

14 Claims, No Drawings

PREPARATION OF 4,5-BIS-(TRIFLUOROMETHYLIMINO)-THIAZOLIDINES

The present invention relates to and has for its objects the provision of a process involving reacting a thiourea or a thiocarboxylic acid amide having at least one hydrogen atom on each urea or amide nitrogen atom with perfluoro-2,5-diazahexa-2,4-diene in the presence of a hydrogen fluoride acceptor at a temperature of about −50° to 120°C to form 4,5-bis-(trifluoromethyliminol)-thiazolidines which are fungicidally, insecticidally and acaricidally active, with other and further objects of the invention becoming apparent from a study of the within specification and accompanying examples.

The invention relates to the preparation of new 4,5-bis-trifluoromethylimino derivatives of thiazolidines of the general formula

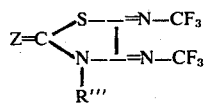 (1)

in which
Z is R—N= or

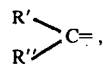

and

R, R', R'' and R'''41 each is hydrogen; alkyl, alkenyl or alkynyl with up to 8 carbon atoms optionally substituted by halogen, cyano, lower alkoxy or alkylmercapto; optionally lower-alkyl-substituted cycloalkyl; carbalkoxy; aralkyl with up to 2 carbon atoms in the alkyl moiety; aryl with up to 14 carbon atoms in the ring system, the aryl radicals optionally being substituted by halogen, cyano, nitro, lower alkyl, haloalkyl, lower alkoxy or alkylmercapto; a 5- to 7-membered heterocyclic ring or a radical which together with Z and the N-atom of the thiazolidine ring forms a further 5- to 7-membered ring, the heterocyclic rings optionally being substituted with halogen, cyano, nitro or lower alkyl, or being fused with a benzene ring which is optionally partially hydrogenated.

In preparing the novel compounds, the thiol form of a thiourea or a thiocarboxylic acid amide having at least one hydrogen atom on each urea or amide nitrogen atom is reacted with perfluoro-2,5-diazahexa-2,4-diene in the presence of a hydrogen fluoride acceptor at a temperature of about −50° to 120°C. Specifically a reactive isomeric form of thiocarboxylic acid amide derivative or thiourea derivative of the general formula

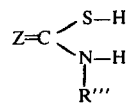 (II)

in which
Z and R''' have the meanings stated above,
is reacted with perfluoro-2,5-diazahexa-2,4-diene of the formula

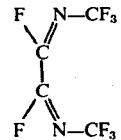 (III)

in the presence of a hydrogen fluoride acceptor at a temperature of about −50° to 120°C.

It is very suprising that the above-mentioned compounds of the formula (II) produce, uniformly and with a satisfactory yield, the hitherto unknown compounds of the formula (I) when reacted with perfluoro-2,5-diazahexa-2,4-diene of the formula (III). Furthermore, it is surprising that the compounds according to the invention possess fungicidal as well as insecticidal and acaricidal effectiveness. The provision of this new class of substances with interesting properties constitutes a technical advance.

If N,N'-diphenyl-thiourea (which reacts in its thiol form) and perfluoro-2,5-diazahexa-2,4-diene are used as starting materials, and sodium fluoride as acid binding agent, the reaction course can be represented by the following formula scheme:

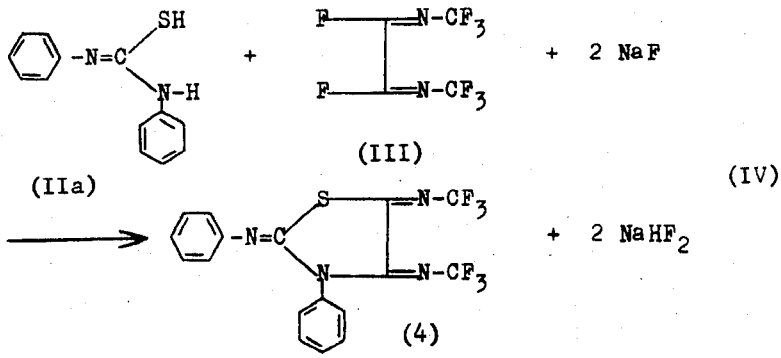

The thiocarboxylic acid amide derivatives or thiourea derivatives to be used as starting materials are, in their isomeric form, defined generally by the above formula (II).

The radicals R, R', R'' and R''' preferably are hydrogen; alkyl or alkenyl with up to 6 carbon atoms, optionally substituted by fluorine, chlorine, bromine and/or alkylmercapto; cyclopentyl or cyclohexyl carbomethoxy or carboethoxy; benzyl or aryl with up to 10 carbon atoms in the ring system, the aromatic rings being optionally substituted by fluorine, chlorine, bromine, cyano, nitro, methyl, ethyl, isopropyl, chloromethyl, trifluoromethyl, methoxy and/or methylmercapto; 5- or 6-membered heterocyclic rings or radicals which together with Z and the N-atom of the thiazole ring form a 5- or 6-membered ring, the heterocyclic rings optionally being fused with a benzene ring which may be partially hydrogenated. Most preferably Z is =N—R, R and R''' being hydrogen, alkyl or aryl, or R and R''' together form a heterocyclic ring.

The thiocarboxylic acid amide derivatives or thiourea derivatives to be used as starting materials which react with the sulfur atom in thiol form as shown in the general, isomeric formula (II), are for the most part known and can be prepared in generally known manner; they are obtained for example when thiocarbonic acid halides are reacted with ammonia or primary amides; many thiourea derivatives can, furthermore, be prepared in known manner from primary amines and isothiocyanates. The following isothiocyanates may be mentioned: methylisothiocyanate, ethylisothiocyanate, butylisothiocyanate, phenylisothiocyanate, p-chlorophenylisothiocyanate. The perfluoro-2,5-diazahexa-2,4-diene of the formula (III) to be used as starting material is known (J. Am. Chem. Soc. 89, 5007 (1967)).

As diluents, all inert organic solvents are suitable. Preferred solvents include hydrocarbons, such as benzine, benzene and toluene; nitriles, such as acetonitrile; and chlorinated hydrocarbons, such as methylene chloride, chloroform and chlorobenzene.

As acid binders, all customary acid-binding agents can be used. There may be mentioned alkali metal carbonates, alkali metal bicarbonates, tertiary amines, such as triethylamine, dimethylaniline. The alkali metal fluorides, especially sodium fluoride, are preferred hydrogen fluoride acceptors.

The reaction temperatures can be varied within a fairly wide range. In general the reaction is carried out at about −50° to 120°C, preferably about −30° to 90°C.

In carrying out of the process according to the invention, for each mole of the compound of formula (II) there is generally used 1 mole of perfluoro-2,5-diazahexa-2,4-diene of the formula (III); the alkali metal fluoride is preferably used in excess, e.g. about 3 to 4 moles, but amounts lesser or greater than the stated proportions by up to 20 per cent by weight can be used without substantial lowering of the yield. Expediently, the perfluoro-2,5-diazahexa-2,4-diene is added dropwise to a suspension of starting material, organic solvent and hydrogen fluoride acceptor. Filtration from the fluoride is then effected, followed by concentration and recrystallization. Another method of working up consists in adding water to the reaction mixture and, optionally, recrystallizing the residue obtained.

The active compounds according to the invention exhibit a strong fungitoxic activity. In the concentrations necessary for the control of fungi, they tend not to damage cultivated plants and they have a low toxicity to warmblooded animals. For these reasons, they are suitable for use as crop protection agents for the control of fungi. Fungitoxic agents in crop protection are used for the control of Archimycetes, Phycomycetes, Ascomycetes, Basidiomycetes and *Fungi Imperfecti.*

The active compounds according to the invention have a broad activity spectrum and can be applied against parasitary fungi which infect above-the-ground parts of plants or attack the plants from the soil, as well as against seed-borne pathogenic agents.

The compounds possess a good activity against *Fusicladium dendriticum*, the causative organism of apple scab, against *Phytophthora infestans*, the causative organism of potato blight, and against *Piricularia oryzae*, the causative organism of rice blast.

The compounds according to the invention, however, also act against other fungi which attack rice or other cultivated plants, for example *Mycosphaerella musicola, Verticillium alboatrum, Phialophora cinerescens* and *Fusarium* species.

The compounds according to the invention are distinguished by an extraordinarily high degree of activity and a very broad spectrum against phytopathogenic soil fungi and against seed-borne fungal plant diseases. They can be used preferably as soil treatment agents and seed dressings and are superior in this respect to customary commercial preparations. The active compounds also possess an insecticidal and acaricidal effectiveness. The products may be used with success in crop protection for the control of noxious sucking and biting insects, Diptera and mites (Acarina), as well as in the veterinary and hygiene field; further, in the protection of stored products against a multiplicity of animal pests such as endoparasites and ectoparasites.

To the sucking insects contemplated herein there belong, in the main, aphids (Aphidae) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the rosy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs for example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus;* and the like.

In the case of the biting insects contemplated herein, above all there should be mentioned butterfly caterpillars (Lepidoptera) such as the diamond-back moth (*Plutella maculipennis*), the gypsy moth (*Lymantria dispar*), the brown-tail moth (*Euproctis chrysorrhoea*) and tent caterpillar *Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kühniella*) and greater wax moth (*Galleria mellonella*); and the like.

With the mites (Acari) there are classed, in particular, the spider mites (Tetranychidae) such as the two-spotted spider mite (*Tetranychus telarius = Tetranychus althaeae* or *Tetranychus urticae*) and the European red mite (*Paratetranychus pilosus = Panonychus ulmi*), gall mites, for example the black currant gall mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*); and the like.

The active compounds according to the instant invention can be utilized, if desired, in the form of the usual formulations or compositions with conventional inert (i.e. plant compatible or herbicidally inert) pesticide diluents or extenders, i.e. diluents or extenders of the type usable in conventional pesticide formulations or compositions, e.g. conventional pesticide dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes), cycloalkanes (e.g. cyclohexane, etc.), paraffins (e.g. petroleum or mineral oil fractions), chlorinated aliphatic hydrocarbons (e.g. methylene chloride, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), ketones (e.g. acetone, methyl ethyl ketone, methyl isobutyl ketone, cyclohexanone, etc.), and/or water: as well as inert dispersible finely divided solid carriers, such as ground natural minerals (e.g. kaolins, alumina, silica, chalk, i.e., calcium carbonate, talc, kieselguhr, etc.) and ground synthetic minerals (e.g. highly dispersed silicic acid, silicates, e.g., alkali silicates, etc.); whereas the following may be chiefly considered for use as conventional carrier vehicle assistants, e.g., surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, etc., and especially alkyl aryl-polyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other fungicides or acaricides, insecticides, herbicides, bactericides, nematicides, fertilizers, growth regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95%, and preferably 0.5–90%, by weight of the mixture, whereas carrier composition mixtures suitable for direct application or field application generally contemplate those in which the active compound is present in an amount substantially between about 0.0001–10%, preferably at least 0.5% weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.1–95%, and preferably 0.5–95% by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50 to 100 microns, or even less, i.e. mist form, for example by airplane crop spraying techniques. Only up to at most about a few liters/hectare are needed, and often amounts only up to about 15 to 1000 g/hectare, preferably 40 to 600 g/hectare, are sufficient. In this process it is possible to use highly concentrated liquid compositions with said liquid carrier vehicles containing from about 20 to about 95% by weight of active compound or even the 100% active substance alone, e.g. about 20–100% by weight of the active compound.

In the case of seed treatment, in general amounts of active compound of 0.01 to 50 g, preferably 0.01 to 5 g, per kilogram of seed are applied as a seed dressing.

For soil treatment, in general amounts of active compound of 1 to 500 g, preferably 10 to 200 g, are applied per cubic meter of soil. The concentrations of active compound in the ready-to-apply preparations may vary very greatly. In general, they are from 0.0001 to 95%.

Furthermore, the present invention contemplates methods of selectively killing, combating or controlling pests, e.g. fungi, insects and acarids, which comprise applying to at least one of correspondingly (a) such fungi, (b) such insects, (c) such acarids and (d) the corresponding habitat thereof, i.e., the locus to be protected, a correspondingly combative or toxic amount, i.e. a fungicidally, insecticidally, or acaricidally effective amount, of the particular active compound of the invention alone or together with a carrier vehicle as noted above. The instant formulations or compositions are applied in the usual manner, for instance by spraying, atomizing, vaporizing, scattering, dusting, watering, sprinkling, pouring, via dressings, incrustations, and the like.

It will be realized, of course, that the concentration of the particular active compound utilized in admixture with the carrier vehicle will depend upon the intended application. Therefore, in special cases, it is possible to go above or below the aforementioned concentration ranges.

The unexpected superiority and outstanding fungicidal and acaricidal activity of such active compounds usable according to the present invention is illustrated, without limitation, by the following Examples.

EXAMPLE 1

Mycelium growth test

| | |
|---|---|
| 20 parts by weight agar-agar | 5 parts by weight peptone |
| 200 parts by weight potato decoction | 2 parts by weight $Na_2HPO_4$ |
| 5 parts by weight malt | 0.3 parts by weight $Ca(NO_3)_2$ |
| 15 parts by weight dextrose | |
| Proportion of solvent to nutrient medium: | |
| 2 parts by weight acetone | |
| 100 parts by weight agar nutrient medium | |

The amount of active compound required for the desired concentration of active compound in the nutrient medium is mixed with the stated amount of solvent. The concentrate is thoroughly mixed in the stated proportion with the liquid nutrient medium which has been cooled to 42°C and is then poured into Petri dishes of 9 cm diameter. Control dishes to which the preparation has not been added are also set up.

When the nutrient medium has cooled and solidified, the dishes are inoculated with the species of fungi stated in the Table and incubated at about 21°C.

Evaluation is carried out after 4–10 days, dependent upon the speed of growth of the fungi. When evaluation is carried out the radial growth of the mycelium on the treated nutrient media is compared with the growth on the control nutrient media. In the evaluation of the fungus growth, the following characteristic values are used:

0 no fungus growth
1 very strong inhibition of growth
2 medium inhibition of growth
3 slight inhibition of growth
4 growth equal to that of untreated control.

The active compounds, their concentrations and the results obtained can be seen from Table 1.

EXAMPLE 2

Fusicladium test (apple scab) (Protective)
Solvent: 4.7 parts by weight acetone
Emulsifier: 0.3 parts by weight alkylaryl polyglycol ether
Water: 95 parts by weight The amount of active compound required for the desired concentration of the active compound in the spray liquid is mixed with the stated amount of solvent, and the concentrate is diluted with the stated amount of water which contains the stated additions.

Young apple seedlings in the 4–6 leaf stage are sprayed with the spray liquid until dripping wet. The plants remain in a greenhouse for 24 hours at 20°C and at a relative atmospheric humidity of 70%. They are then inoculated with an aqueous conidium suspension of the apple scab causative organism (*Fusicladium dendriticum* Fuckel) and incubated for 18 hours in a humidity chamber at 18°–20°C and at a relative atmospheric humidity of 100%.

The plants are then again placed in a greenhouse for 14 days.

15 days after inoculation, the infection of the seedlings is determined as a percentage of the untreated but also inoculated control plants.

0% means no infection; 100% means that the infection is exactly as great as in the case of the control plants.

The active compounds, the concentrations of the active compounds and the results can be seen from Table 2:

Table 1

| Active compounds | | Concentration of active compound ppm | a | b | c | d | e | f | g | h | i | j | k |
|---|---|---|---|---|---|---|---|---|---|---|---|---|---|
| 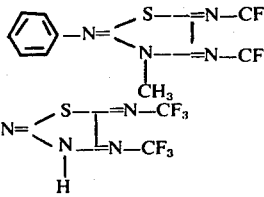 | (11) | 10 | — | — | — | — | — | 0 | 0 | 0 | — | 0 | 0 |
| 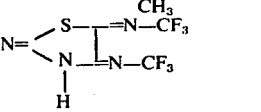 | (2) | 10 | — | — | — | — | — | — | — | — | — | — | 1 | a *Botrytis cinera*
b *Cochliobolus miyabeanus*
c *Fusarium oxysp. f. cubense*
d *Fusarium oxysp. f. dianthi*
e *Pelliculoria saskaii*
f *Verticillium albo-atrum*
g *Colletorichum coffeanum*
h *Phialophora cinerescens*
i *Cercospora personata*
j *Mycosphaerella musicola*
k *Piricularia oryza*

Table 2

| Active compound | Fusicladium test / Protective Infection as a percentage of the infection of the untreated control with a concentration of active compound (in %) of | |
|---|---|---|
| | 0.0062% | 0.00156% |
| 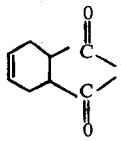 (A) (known) | 26 | 50 |
| 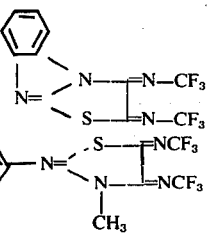 (I) | 0 | 33 |
| 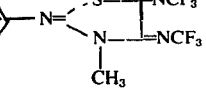 (II) | 0 | 2 |

Table 3

| Active compound | Phytophthora test Infection as a percentage of the infection of the untreated control with a concentration of active compound (in %) of | |
|---|---|---|
| | 0.0062 | 0.0031 |
| 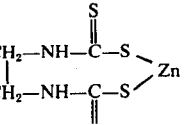 (B) (known) | 23 | 41 |
| 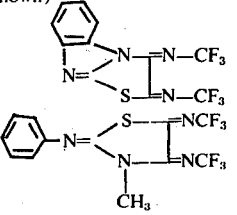 (I) | 18 | — |
| 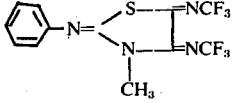 (II) | 2 | 26 |

EXAMPLE 3

Phytophthora test
 Solvent: 4.7 parts by weight of acetone
 Dispersing agent: 0.3 parts by weight of alkylarylpolyglycol ether
 Water: 95 parts by weight The amount of the active compound required for the desired concentration of the active compound in the spray liquid is mixed with the stated amount of solvent and the concentrate is diluted with the stated amount of water which contains the stated additions.

Young tomato plants (Bonny best) with 2–6 foliage leaves are sprayed with the spray liquid until dripping wet. The plants remain in a greenhouse for 24 hours at 20°C and at a relative atmospheric humidity of 70%. The tomato plants are then inoculated with an aqueous spore suspension of *Phytophthora infestans*. The plants are brought into a moist chamber with an atmospheric humidity of 100% and a temperature of 18° – 20°C.

After 5 days the infestation of the tomato plants is determined as a percentage of the untreated but likewise inoculated control plants: 0% means no infestation; 100% means that the infestation is exactly as great as in the case of the control plants.

The active compounds, the concentrations of the active compounds and the results can be seen from the following Table:

EXAMPLE 4

Agar plate test

Test for fungitoxic effectiveness and breadth of the activity spectrum.
 Solvent: Acetone
 Parts by weight: (a) 1000 (b) 100

To produce a suitable preparation of the active compound, 1 part by weight of the active compound is taken up in the stated amount of solvent.

To potato dextrose agar which has been liquefied by heating there is added the preparation of the active compound in such an amount that the desired concentration of active compound is set up therein. After thorough shaking to achieve a uniform dispersion of the active compound, the agar is poured into Petri dishes under sterile conditions. When the mixture of substrate and active compound has solidified, test fungi from pure cultures are inoculated on to it in small discs of 5 mm diameter. The Petri dishes remain at 20°C for 3 days for incubation.

After this time, the inhibiting action of the active compound on the mycelium growth is determined in categories, taking into account the untreated control. 0 means no mycelium growth, either on the treated substrate or on the inoculum; the symbol - means mycelium growth on the inoculum only, no spread to the treated substrate; and the symbol + means mycelium growth from the inoculum on to the treated substrate, similar to the spread to the untreated substrate of the control.

The active compounds, the concentration of the active compounds, the test fungi and the inhibition effects achieved can be seen from the following Table 4.

Table 4

| Active compound | Agar plate test Concentration of active compound in the substrate in mg/litre | a | b | c | d | e | f | g | h |
|---|---|---|---|---|---|---|---|---|---|
| Untreated | — | + | + | + | + | + | + | + | + |
| 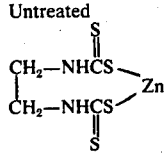 (B) (known) | a) 10 | + | + | + | + | + | + | + | + |
| | b) 100 | + | + | + | 0 | + | + | + | + |

Table 4 — Continued

| Active compound | | Agar plate test Concentration of active compound in the substrate in mg/litre | a | b | c | d | e | f | g | h |
|---|---|---|---|---|---|---|---|---|---|---|
| 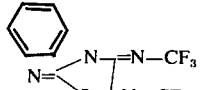 | (1) | a) 10<br>b) 100 | 0<br>0 | −<br>0 | +<br>0 | −<br>0 | +<br>0 | +<br>0 | +<br>+ | +<br>0 |
| 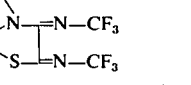 | (3) | a) 10<br>b) 100 | 0<br>0 | +<br>0 | +<br>0 | 0<br>0 | 0<br>0 | +<br>0 | +<br>0 | +<br>0 |
| 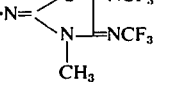 | (11) | a) 10<br>b) 100 | 0<br>0 | 0<br>0 | 0<br>0 | 0<br>0 | 0<br>0 | 0<br>0 | 0<br>0 | 0<br>0 | a *Corticium rolfsii*
b *Sclerotinia sclerotiorum*
c *Verticillium alboatrum*
d *Thielaviopsis basicola*
e *Phytophthora cactorum*
f *Fusarium culmorum*
g *Fusarium oxysporum*
h *Fusarium solani f. pisi*

EXAMPLE 5

Seed dressing test/bunt of wheat
(seed-borne mycosis)

To produce a suitable dry dressing, the active compound is extended with a mixture of equal parts by weight of talc and kieselguhr to give a finely powdered mixture with the desired concentration of the active compound.

Wheat seed is contaminated with 5 g of the chlamydospores of *Tilletia caries* per kg of seed. To apply the dressing, the seed is shaken with the dressing in a closed glass flask. The seed, on moist loam under a cover of a layer of muslin and 2 cm of moderately moist compost soil, is exposed to optimum germination conditions for the spores for 10 days at 10°C in a refrigerator.

The germination of the spores on the wheat grains, each of which is contaminated with about 100,000 spores, is subsequently determined microscopically. The smaller the number of spores which have germinated, the more effective is the active compound.

The active compounds, the concentrations of the active compounds in the dressing, the amounts of dressing used and the percentage spore germination can be seen from the following Table 5.

Table 5

| Active compounds | | Seed dressing test / bunt of wheat Concentration of active compound in the dressing in % by weight | Applied amount of dressing in g/kg seed | Spore germination in % |
|---|---|---|---|---|
| non-dressed | | — | — | >10 |
| 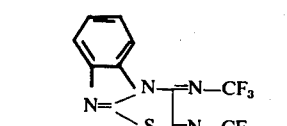<br>(known) | (B) | 10<br>30 | 1<br>1 | 5<br>0.05 |
| 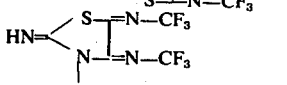 | (1) | 3<br>10<br>30 | 1<br>1<br>1 | 0.5<br>0.000<br>0.000 |
| 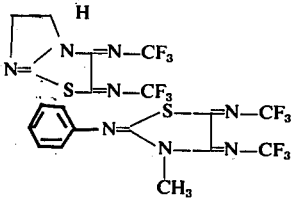 | (2) | 10<br>30 | 1<br>1 | 0.005<br>0.005 |
|  | (3) | 10<br>30 | 1<br>1 | 0.05<br>0.000 |
| 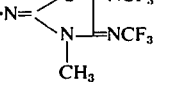 | (11) | 10<br>30 | 1<br>1 | 0.005<br>0.000 |

EXAMPLE 6

Seed dressing test/stripe disease of barley
(seed-borne mycosis)

To produce a suitable dry dressing, the active compound is extended with a mixture of equal parts by weight of talc and kieselguhr to give a finely powdered mixture with the desired concentration of active compound.

To apply the dressing, barley seed, which is naturally infested by *Helminthosporium gramineum*, is shaken with the dressing in a closed glass flask. The seed, on moist filter paper discs in closed Petri dishes, is exposed to a temperature of 4°C for 10 days in a refrigerator. The germination of the barley, and possibly also of the fungus spores, is thereby initiated. Two batches of 50 grains of the pregerminated barely are subsequently sown 2 cm deep in Fruhstorfer standard soil and cultivated in a greenhouse at temperatures of about 18°C in seed boxes which are exposed to light for 16 hours daily. The typical symptoms of the stripe disease develop within 3 to 4 weeks.

After this time, the number of diseased plants is determined as a percentage of the total number of emerged plants. The fewer plants are diseased, the more effective is the active compound.

The active compounds, the concentration of the active compounds in the dressing, the amounts of dressing used and the number of diseased plants can be seen from Table 6:

100% means that healthy plants have resulted from all the seeds.

The active compounds, the concentrations of the active compounds in the soil, the test fungi, host plants, greenhouse temperatures and the results obtained can be seen from Table 7:

Table 7

Soil treating agent test / soil-born mycosis
Test fungi: Fusarium culmorum
Host plant: Pea
Temperature range: 22–25°

| Active compounds | Concentration of active compound in mg/liter soil | |
|---|---|---|
| Fruhstorfer standard soil, sterilized untreated | — | 90 |
| Fruhstorfer standard soil, sterilized untreated $\begin{array}{c} CH_2-NHCS \\ | \\ CH_2-NHCS \end{array} \!\!\!\!\!>\!\!Zn$ with C=S groups (known) (B) | — | 20 |
|  | 100 | 2 |
| phenyl-N=C(S-N=CF_3)(N(CH_3)-N=CF_3) | 100 | 65 |

Table 6

| Active compound | Seed dressing test/stripe disease of barley | | |
|---|---|---|---|
|  | Concentration of active compound in the dressing in % by weight | Applied amount of dressing in g/kg seed | Number of stripe-diseased plants as a percenetage of the total number of emerged plants |
| non-dressed | — | — | 23.6 |
| N=C(S-N=CF_3)(N-N=CF_3) fused (3) | 30 | 2 | 3.1 |
| phenyl-N=C(S-N=CF_3)(N(CH_3)-N=CF_3) (11) | 30 | 2 | 10.1 |

EXAMPLE 7

Soil treating agent test/soil-borne mycoses

To produce a suitable preparation of the active compound, the active compound is extended with talc to a content of 5% and subsequently with quartz sand to a content of 0.5% of active compound.

The preparation of the active compound is uniformly mixed with Fruhstorfer standard soil, which has first been sterilized and then inoculated with pure cultures of the test fungi.

The soil is filled into 5 pots, each of which is sown with 10 seeds of the host plants. The pots are placed in a greenhouse at the stated temperatures and kept normally moist.

3 weeks after sowing, the number of healthy plants is determined as a percentage of the number of seeds sown. 0% means that no healthy plants have grown;

EXAMPLE 8

Tetranychus test/phosphoric acid ester resistant strain
Solvent: 3 parts by weight dimethyl formamide
Emulsifier: 1 part by weight alkylarylpolyglycol ether To produce a suitable preparation of active compound, 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100% means that all the spider mites are killed whereas 0% means than none of the spider mites are killed.

The active compounds, the concentrations of the active compounds, the evaluation times and the results can be seen from the following Table 8.

stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants are heavily infested with spider mites (*Tetranychus urticae*) in all stages of development.

Table 8

| Active compounds | (plant-damaging mites) Tetranychus test | Concentration of active compound in % | Degree of destruction in % after 8 days |
|---|---|---|---|
| [structure: (CH₃)₂N—CH=N—C₆H₄—O—CO—NH—CH₃] (known) (C) | | 0.2<br>0.02 | 100<br>0 |
| [structure with S, N—CF₃, two phenyl groups] (4) | | 0.2<br>0.02<br>0.002 | 100<br>100<br>98 |
| [structure with o-tolyl, N=, S, N—CF₃, N—CF₃] (1) | | 0.2<br>0.02 | 100<br>98 |

EXAMPLE 9

Tetranychus test/carbamate resistant strain
  Solvent: 3 parts by weight acetone
  Emulsifier: 1 part by weight alkylaryl polyglycol ether To produce a suitable preparation of active compound, 1 part by weight of the active compound is mixed with the stated amount of solvent containing the stated amount of emulsifier and the concentrate so obtained is diluted with water to the desired concentration.

After the specified periods of time, the effectiveness of the preparation of active compound is determined by counting the dead mites. The degree of destruction thus obtained is expressed as a percentage: 100% means that all the spider mites are killed whereas 0% means that none of the spider mites are killed.

The active compounds, the concentrations of the active compounds, the evaluation times and the results can be seen from the following Table 9.

Table 9

| Active compounds | (plant-damaging mites) Tetranychus test/carbamate resistant strain | Concentration of active compound in % | Degree of destruction in % after 8 days |
|---|---|---|---|
| [structure: 3,5-dimethyl-4-methylthiophenyl-O—C(=O)—NH—CH₃] (E) (known) | | 0.1 | 0 |
| [structure with o-tolyl, N=, S, N—CF₃, N—CF₃] (1) | | 0.1<br>0.02 | 100<br>95 |

EXAMPLE 10

Phaedon larvae test
Solvent: 3 parts by weight dimethyl formamide
Emulsifier: 1 part by weight alkylaryl polyglycol ether To produce a suitable preparation of active compound, 1 part by weight of the active compound is mixed with the stated amount of solvent containing the stated amount of emulsifier, and the concentrate is diluted with water to the desired concentration.

Cabbage leaves (*Brassica oleracea*) are sprayed with the preparation of the active compound until dripping wet and then infested with mustard beetle larvae (*Phaedon cochleariae*).

After the specified periods of time, the degree of destruction is determined as a percentage: 100% means that all the beetle larvae are killed. 0% means that none of the beetle larvae are killed.

The active compounds, the concentration of the active compound, the times of evaluation and the results can be seen from the following Table 10.

Table 10

| Active compounds | (plant-damaging insects) Phaedon larvae test | | |
|---|---|---|---|
| | | Concentration of active compound in % | Degree of destruction in % after 3 days |
| CH₃\N—CH=N—(phenyl-Cl,CH₃) (known) | (C) | 0.2<br>0.02 | 85<br>0 |
| (benzimidazole fused) N——=N—CF₃ / S——=N—CF₃ | (3) | 0.2<br>0.02 | 100<br>30 |
| CH₃\N= / S——=N—CF₃ / N——=N—CF₃ (phenyl) | (5) | 0.2<br>0.02 | 100<br>30 |

The following further examples are set forth to illustrate, without limitation, the process for producing the active compounds according to the present invention.

EXAMPLE 11

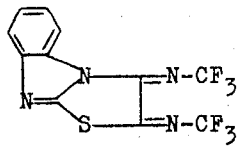

(1)

To 15 g (0.1 mole) of 2-mercapto-benzimidazole and 15 g of sodium fluoride in 150 ml of acetonitrile there are added dropwise, at 0°C, with cooling, 23 g (0.1 mole) of perfluoro-2,5-diazahexa-2,4-diene. Stirring is afterwards efffected for 2 hours at room temperature followed by addition of 1 liter of water to the reaction mixture and then filtration. After recrystallization of the residue from acetone there are obtained 31 g of the compound of the above formula of m.p. 201° – 202°C. Yield: 92% of theory.

EXAMPLE 12

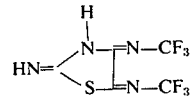

(2)

Analogously with Example 12, with thiourea instead of 2-mercapto-benzimidazole there are obtained, after working up with 1 liter of water, 21 g of 2-imino-4,5-bis-trifluoromethylimino-thiazolidine of m.p. 150°C (with decomposition). Yield: 80% of theory.

EXAMPLE 13

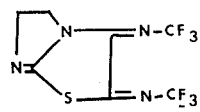

(3)

Analogously with Example 12 with N,N'-ethylenethiourea there are obtained 23 g of the above compound of m.p. 86° – 87°C (from ether/pentane). Yield: 79% of theory.

EXAMPLE 14

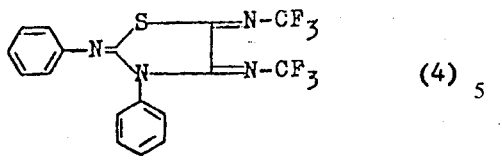

(4)

Analogously with Example 12, with N,N'-diphenylthiourea there are obtained 35 g of the above compound of m.p. 118°–119°C (from methanol). Yield: 84% of theory.

EXAMPLE 15

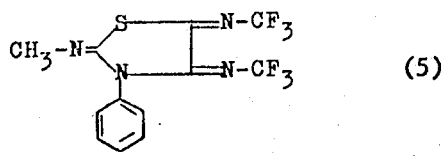

(5)

Analogously with Example 12, with N-phenyl-N'-methylthiourea there are obtained 30 g of the above compound of m.p. 168°– 169°C. Yield: 80% of theory.

EXAMPLE 16

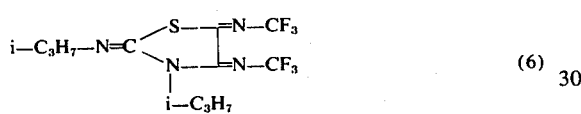

(6)

Analogously with Example 12, with N,N'-diisopropylthiourea there is obtained the compound of the above formula of m.p. 45° – 46°C. Yield: 80% of theory.

EXAMPLE 17

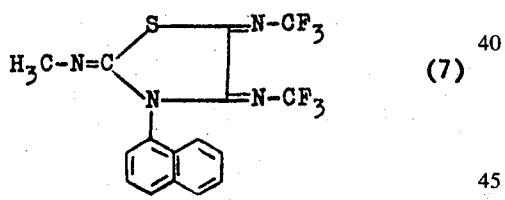

(7)

Analogously with Example 12, with N-naphthyl-N'-methylthio urea there is obtained the compound of the above formula of m.p. 190°– 191°C. Yield: 81% of theory.

EXAMPLE 18

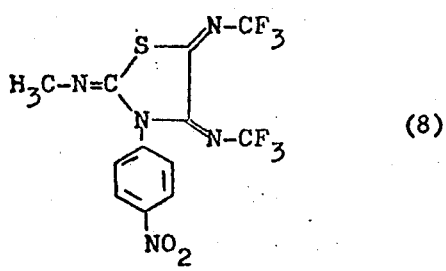

(8)

Analogously with Example 12, with N-p-nitrophenyl-N'-methylthiourea there is obtained the compound of the above formula of m.p. 174° to 175°C. Yield: 78% of theory.

EXAMPLE 19

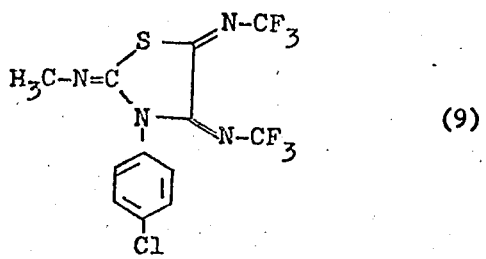

(9)

Analogously with Example 12, with N-p-chlorophenyl-N'-methyl thiourea there is obtained the compound of the above formula of m.p. 212° to 213°C. Yield: 77% of theory.

It will be appreciated that the instant specification and examples are set forth by way of illustration and not limitation, and that various modifications and changes may be made without departing from the spirit and scope of the present invention.

What is claimed is:

1. 4,5-Bis-trifluoromethylimino dervatives of thiazolidines of the general formula:

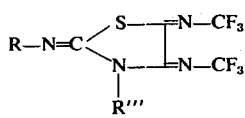

in which
R and R''' each is hydrogen, alkyl, alkenyl or alkynyl with up to 8 carbon atoms optionally substituted by halogen, cyano, lower alkoxy or alkylmercapto of up to 3 carbon atoms, cyclopentyl or cyclohexyl optionally substituted with alkyl of up to 3 carbon atoms; carbalkoxy having up to 8 carbon atoms in the alkoxy group; phenylalkyl or naphthylalkyl with up to 2 carbon atoms in the alkyl moiety; phenyl or naphthyl radicals optionally being substituted by halogen, cyano, nitro, lower alkyl of up to 3 carbon atoms, haloalkyl of up to 8 carbon atoms, lower alkoxy or alkylmercapto of up to 3 carbon atoms; or together are an ethylene, propylene or o-phenylene radical.

2. Compounds according to claim 1 in which R and R''' are hydrogen; alkyl or alkenyl with up to 6 carbon atoms, optionally substituted by fluorine, chlorine, bromine or alkylmercapto of up to 3 carbon atoms; cyclopentyl or cyclohexyl; carbomethoxy or carboethoxy; benzyl, phenyl or naphthyl, the aromatic rings being optionally substituted by fluorine, chlorine, bromine, cyano, nitro, methyl, ethyl, isopropyl, chloromethyl, trifluoromethyl, methoxy or methylmercapto; or together are an ethylene, propylene or o-phenylene radical.

3. Compounds according to claim 2, in which R and R''' are hydrogen, alkyl, phenyl or naphthyl or together are an ethylene or o-phenylene radical.

4. The compound according to claim 1 of the formula:

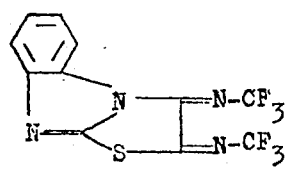

(1)

5. The compound according to claim 1 of the formula:

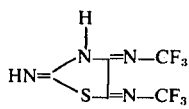

(2).

6. The compound according to claim 1 of the formula:

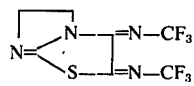

(3).

7. The compound according to claim 1 of the formula:

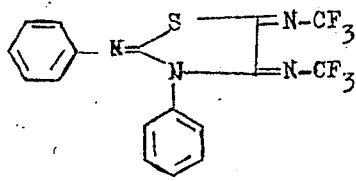

(4)

8. The compound according to claim 1 of the formula

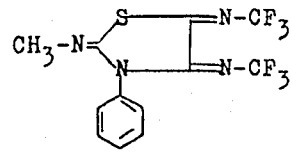

9. The compound according to claim 1 of the formula:

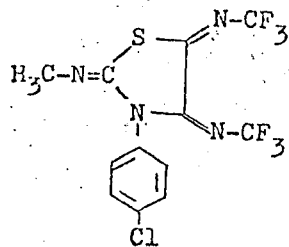

10. The process which comprises reacting a thiol reactant of the formula

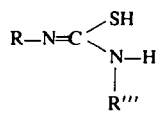

in which
R and R''' each is hydrogen, alkyl, alkenyl or alkynyl with up to 8 carbon atoms optionally substituted by halogen, cyano, lower alkoxy or alkylmercapto of up to 3 carbon atoms, cyclopentyl or cyclohexyl optionally substituted with alkyl of up to 3 carbon atoms; carbalkoxy having up to 8 carbon atoms in the alkoxy group; phenalkyl or naphthylalkyl with up to 2 carbon atoms in the alkyl moiety; phenyl or naphthyl radicals optionally being substituted by halogen, cyano, nitro, lower alkyl of up to 3 carbon atoms, haloalkyl of up to 8 carbon atoms, lower alkoxy or alkylmercapto of up to 3 carbon atoms; or together are an ethylene, propylene or o-phenylene radical, with perfluoro-2,5-diazahexa-2,4-diene in the presence of a hydrogen fluoride acceptor at a temperature of about −50° to 120°C thereby to produce a 4,5-bis-(trifluoromethylimino)-thiazolidine.

11. The process according to claim 10 in which R and R''' are hydrogen; alkyl or alkenyl with up to 6 carbon atoms, optionally substituted by fluorine, chlorine, bromine or alkylmercapto of up to 3 carbon atoms; cyclopentyl or cyclohexyl; carbomethoxy or carboethoxy; benzyl hydrocarbon, phenyl or naphthyl, the aromatic rings being optionally substituted by fluorine, chlorine, bromine, cyano, nitro, methyl, ethyl, isopropyl, chloromethyl, trifluoromethyl, methoxy or methylmercapto; or together are an ethylene, propylene or o-phenylene radical.

12. The process according to claim 11 in which R and R''' are hydrogen, alkyl, phenyl or naphthyl or together are an ethylene or o-phenylene radical.

13. A process according to claim 10 in which the hydrogen fluoride acceptor is an alkali metal fluoride.

14. The process according to claim 13, in which the thiourea or thiocarboxylic acid amide reactant is N,N'-diphenylthiourea.

* * * * *